(12) United States Patent
Murray et al.

(10) Patent No.: US 12,276,225 B2
(45) Date of Patent: Apr. 15, 2025

(54) GAS TURBINE ENGINE

(71) Applicant: ROLLS-ROYCE plc, London (GB)

(72) Inventors: Christopher A. Murray, Nottingham (GB); Nicholas Howarth, Derby (GB); Richard G. Stretton, Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 141 days.

(21) Appl. No.: 18/184,008

(22) Filed: Mar. 15, 2023

(65) Prior Publication Data

US 2023/0323810 A1  Oct. 12, 2023

(30) Foreign Application Priority Data

Apr. 7, 2022  (GB) .................................. 2205076

(51) Int. Cl.
*F02C 6/08* (2006.01)
*B64D 13/00* (2006.01)
(Continued)

(52) U.S. Cl.
CPC .............. *F02C 6/08* (2013.01); *F02C 7/185* (2013.01); *B64D 13/006* (2013.01); *B64D 13/02* (2013.01); *B64D 13/08* (2013.01); *B64D 33/08* (2013.01); *F02C 7/12* (2013.01); *F02C 7/18* (2013.01); *F02C 9/16* (2013.01); *F02C 9/20* (2013.01);
(Continued)

(58) Field of Classification Search
CPC combination set(s) only.
See application file for complete search history.

(56) References Cited

U.S. PATENT DOCUMENTS 4,091,613 A    5/1978  Young
4,543,785 A *  10/1985 Patrick ................... F02K 7/16
                                                        60/263
(Continued)

FOREIGN PATENT DOCUMENTS

EP    3002431 A1    4/2016
EP    3260686 A1    12/2017
(Continued)

OTHER PUBLICATIONS

European search report dated Dec. 4, 2023, issued in EP Patent Application No. 23160336.6.
(Continued)

*Primary Examiner* — Binh Q Tran (57) ABSTRACT

There is provided a gas turbine engine comprising a blower system for supplying pressurised air to an airframe via an airframe port. The blower system comprises a compressor configured to receive air from a bypass duct or a core of the gas turbine engine and to discharge compressed air into a delivery line extending from the compressor to the airframe port. The blower system also comprises a heat exchanger configured to transfer heat from the compressed air to a coolant and a valve arrangement configured to switch between operation of the blower system in a baseline mode and a cooling mode, the valve arrangement being configured to: selectively divert the compressed air within the delivery line to the heat exchanger for operation in the cooling mode; and/or selectively provide the coolant to the heat exchanger for operation in the cooling mode.

20 Claims, 7 Drawing Sheets

(51) Int. Cl.
B64D 13/02 (2006.01)
B64D 13/08 (2006.01)
B64D 33/08 (2006.01)
F02C 7/12 (2006.01)
F02C 7/18 (2006.01)
F02C 9/16 (2006.01)
F02C 9/20 (2006.01)
F02C 9/54 (2006.01)

(52) U.S. Cl.
CPC .......... *F02C 9/54* (2013.01); *F05D 2260/205* (2013.01); *F05D 2260/232* (2013.01)

(56) References Cited

U.S. PATENT DOCUMENTS

| | | | |
|---|---|---|---|
| 5,363,641 A | 11/1994 | Dixon et al. | |
| 2010/0319359 A1 | 12/2010 | Holt et al. | |
| 2012/0216545 A1 | 8/2012 | Sennoun et al. | |
| 2012/0297789 A1* | 11/2012 | Coffinberry | B64D 37/34 60/39.83 |
| 2014/0248119 A1* | 9/2014 | Jen | F02C 7/14 415/208.1 |
| 2017/0044984 A1* | 2/2017 | Pesyna | F02K 3/115 |
| 2017/0363003 A1* | 12/2017 | Evetts | F02C 6/08 |
| 2019/0309683 A1* | 10/2019 | Mackin | F02C 7/047 |
| 2020/0011247 A1* | 1/2020 | Schwarz | F02C 7/185 |
| 2021/0348564 A1* | 11/2021 | Mackin | F02C 7/047 |

FOREIGN PATENT DOCUMENTS

| | | |
|---|---|---|
| EP | 3517436 B1 | 5/2020 |
| EP | 3517437 B1 | 5/2020 |
| EP | 3517438 B1 | 6/2020 |
| WO | 2022091273 A1 | 5/2022 |

OTHER PUBLICATIONS

Great Britain search report dated Aug. 30, 2022, issued in GB Patent Application No. 2205076.9.

Great Britain search report dated Feb. 25, 2025, issued in GB Patent Application No. 2205076.9.

* cited by examiner

GAS TURBINE ENGINE

CROSS-REFERENCE TO RELATED APPLICATIONS

This specification is based upon and claims the benefit of priority from United Kingdom Patent Application No. 2205076.9, filed on 7 Apr. 2022, the entire contents of which are incorporated herein by reference.

BACKGROUND

Technical Field

The present disclosure relates to a gas turbine engine comprising a blower system for providing pressurised air to an airframe. The disclosure also concerns an aircraft comprising an airframe system and a gas turbine engine, the gas turbine engine comprising a blower system for providing pressurised air to an airframe.

Description of the Related Art

It is known to pressurise a cabin of an aircraft using engine bleed air which is bled from a compressor section of the core of a gas turbine engine. Bleeding high pressure air from the gas turbine engine reduces its efficiency and thereby increases its fuel consumption.

Blower systems which make use of air which is taken from a lower pressure source of a gas turbine engine, such as a bypass duct, and which subsequently compress the air prior to delivering it to the cabin are also known. Some exemplary blower systems are described in EP3517436 B1, EP3517437 B1 and EP3517438 B1.

SUMMARY

According to a first aspect, there is provided a gas turbine engine comprising a blower system for supplying pressurised air to an airframe via an airframe port, the blower system comprising: a compressor configured to receive air from a bypass duct or a core of the gas turbine engine and discharge compressed air into a delivery line extending from the compressor to the airframe port; a heat exchanger configured to transfer heat from the compressed air to a coolant; a valve arrangement configured to switch between operation of the blower system in a baseline mode and a cooling mode, the valve arrangement being configured to: selectively divert the compressed air within the delivery line to the heat exchanger for operation in the cooling mode; and/or selectively provide the coolant to the heat exchanger for operation in the cooling mode.

It may be that the compressor is operable in a blower mode in which the compressor is configured to be driven to rotate by a spool of a gas turbine engine to draw air from the bypass duct of the gas turbine engine and discharge compressed air into a delivery line. It may also be that the compressor is operable in an engine drive mode in which the compressor is configured to receive air from the delivery line to drive the spool of the gas turbine engine to rotate.

The valve arrangement may be in either of the baseline mode and the cooling mode, irrespective of whether the compressor is operating in the blower mode or the engine drive mode. Nevertheless, it may be that a demand for cooling corresponds to the blower mode, such that in use the valve arrangement is controlled to operate the blower system in the cooling mode only when the compressor is operated in the blower mode. A controller of the blower system may be configured to control the valve arrangement to switch between the baseline mode and the cooling mode when the compressor is operated in the blower mode.

It may be that the valve arrangement is configured to selectively divert compressed air within the delivery line to the heat exchanger for operation in the cooling mode, the delivery line comprising a cooling path extending through the heat exchanger and a bypass path bypassing the heat exchanger and the valve arrangement being configured to selectively divert compressed air within the delivery line to the heat exchanger for operation in the cooling mode by actuating a first valve to control a flow rate of compressed air through the cooling path.

It may be that the bypass path and the cooling path extend between an upstream junction and a downstream junction. The compressed air valve may be disposed at either, or between, the upstream junction and the downstream junction.

The first valve may be configured to selectively restrict flow along the bypass path and the valve arrangement may be configured to actuate the first valve to vary a proportion of the compressed air which flows along the cooling path and a proportion of the compressed air which flows along the bypass path.

It may be that a second valve of the valve arrangement is configured to selectively restrict flow along the cooling path. It may be that the valve arrangement is configured to actuate both the first valve and the second valve to vary a proportion of the compressed air which flows along the cooling path and a proportion of the compressed air which flows along the bypass path.

It may be that the first valve is configured to selectively restrict flow along the bypass path and that the valve arrangement is further configured to selectively divert compressed air within the delivery line away from the heat exchanger for operation in the first mode by actuating a second valve to control a flow rate of compressed air through the cooling path, the valve being configured to selectively restrict flow along the cooling path.

The delivery line may comprise a selective heat exchange module integrating the heat exchanger, the valve arrangement for selectively diverting compressed air to the heat exchanger in the cooling mode, and the bypass path. It may be that the selective heat exchange module has a nested arrangement in which one of the cooling path and the bypass path extends through the other of the cooling path and the bypass path.

It may be that the valve arrangement is configured selectively provide the coolant to the heat exchanger for operation in the cooling mode. The heat exchanger may have a coolant side and a compressed air side forming a portion of the delivery line.

A minimum cross-sectional area of the delivery line through the compressed air side of the heat exchanger may be equal to or greater than 100 cm$^2$. The minimum cross-sectional area of the delivery line through the compressed air side of the heat exchanger may be equal to or greater than 150 cm$^2$. The minimum cross-sectional area of the delivery line through the compressed air side of the heat exchanger may be equal to or greater than 175 cm$^2$.

It may be that the heat exchanger has a tube-in-tube arrangement of the coolant side and the compressed air side. The heat exchanger may at least partially extends through a pylon of the gas turbine engine, the pylon being configured to attach the gas turbine engine to an aircraft.

The valve arrangement may be configured to selectively provide the coolant to the heat exchanger for operation in the cooling mode by actuating a coolant valve to control a flow rate of coolant through the heat exchanger. The heat exchanger may be configured to receive the coolant from the bypass duct of the gas turbine engine. It may be that the heat exchanger is configured to discharge the coolant to an external environment.

The gas turbine engine may comprise a controller configured to receive a cooling signal relating to a temperature of the compressed air provided by the delivery line; the controller being configured to control the valve arrangement to switch between operation of the blower system in the baseline mode and the cooling mode based on the cooling signal. The cooling signal may be provided by a temperature sensor disposed along the delivery line and configured to monitor a temperature of compressed air in the delivery line.

The gas turbine engine may comprise a temperature sensor configured to monitor a temperature of compressed air at a monitoring location on the delivery line between the compressor and the heat exchanger, the gas turbine engine comprising a controller configured to control the valve arrangement to switch between operation of the blower system in the baseline mode and the cooling mode based on the monitored temperature.

The controller is configured to control the valve arrangement so as to: maintain the blower system in the cooling mode in response to a determination that the temperature of the compressed air at the monitoring location is equal to or greater than an air temperature threshold; and maintain the blower system in the baseline mode in response to a determination that the temperature of the compressed air at the monitoring location is less than the air temperature threshold; the air temperature threshold being between 200° C. and 280° C. The air temperature threshold may be between 220° C. and 260° C. It may be that the compressed air temperature threshold is approximately equal to 240° C.

The gas turbine engine may be configured so that, in a core exhaust mode, a coolant side of the heat exchanger is configured to receive an exhaust flow of air from a core annulus of the gas turbine for discharge to an external environment.

The gas turbine engine may further comprise a core exhaust valve configured to switch the gas turbine engine between a coolant mode in which the heat exchanger is configured to receive the coolant and the core exhaust mode.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to another aspect, there is provided an aircraft comprising a gas turbine engine according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
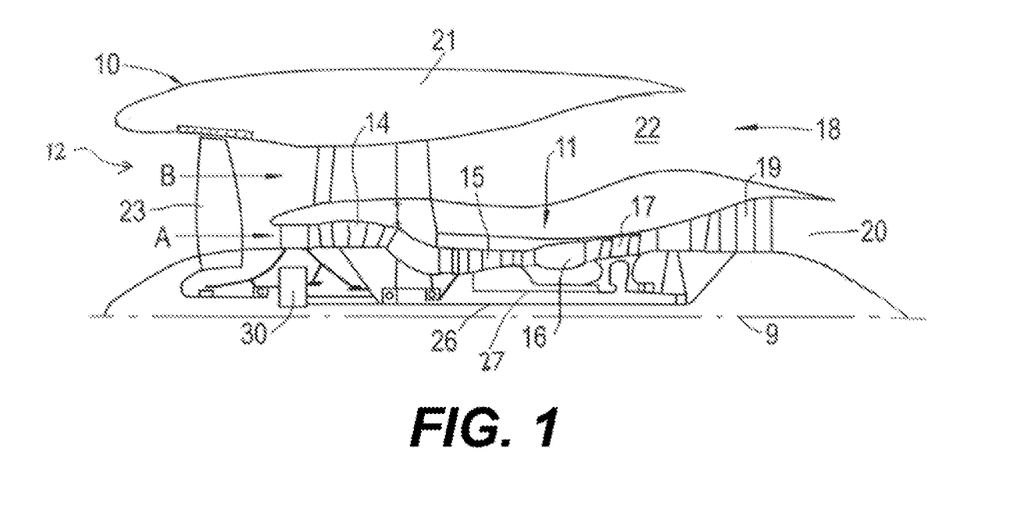
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
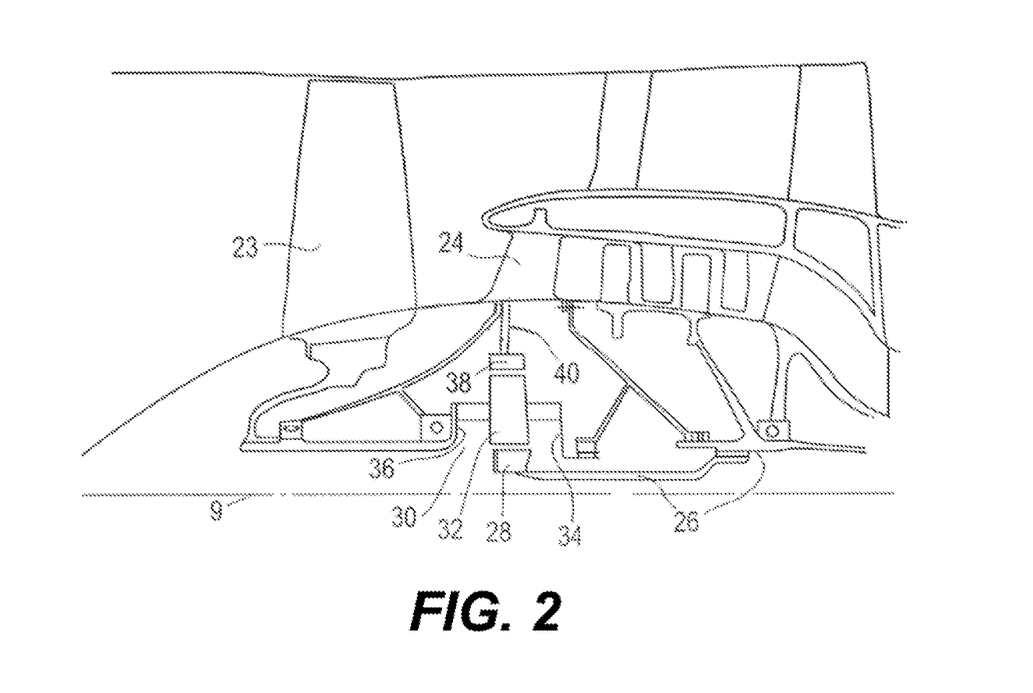
FIG. 2 shows a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
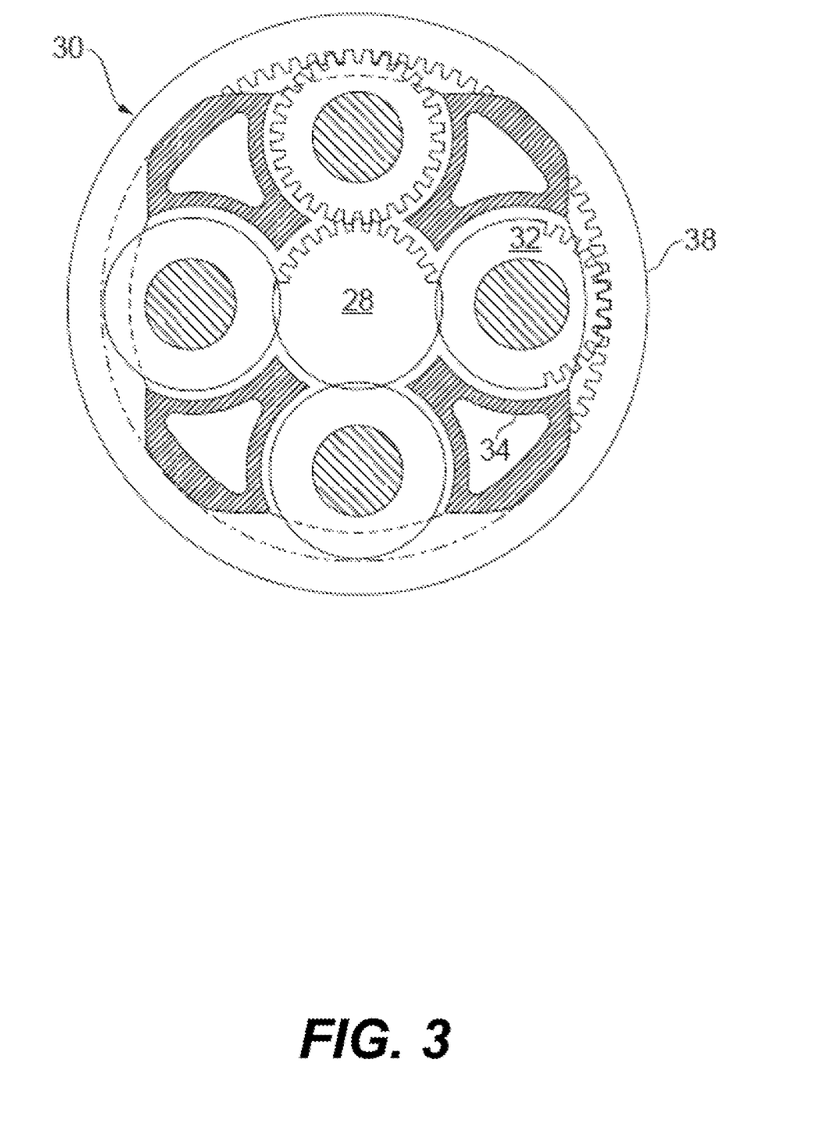
FIG. 3 shows a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
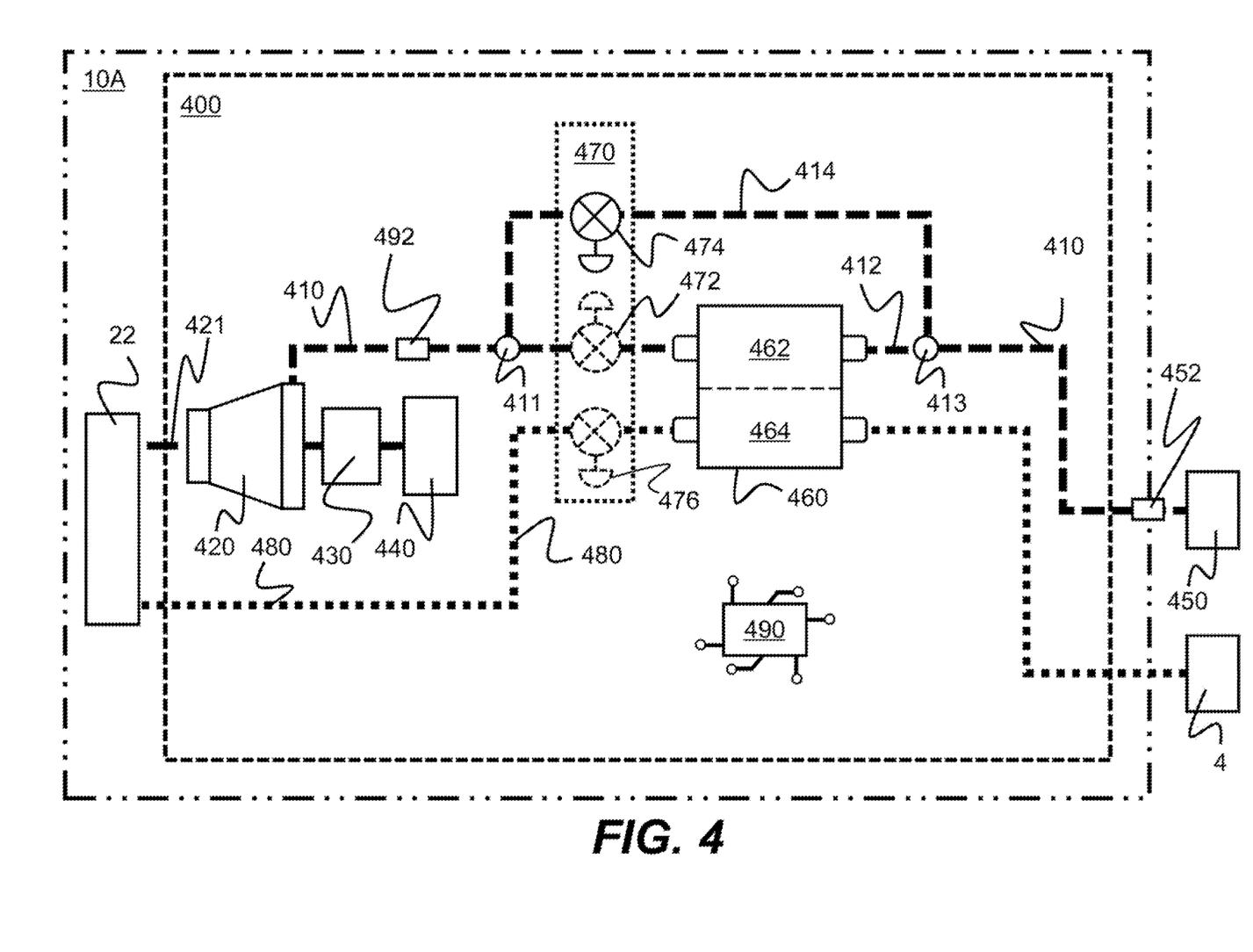
FIG. 4 shows a schematic diagram of a first example gas turbine engine comprising a blower system for supplying pressurised air to an airframe system.

A schematic diagram of a first example gas turbine engine 10A comprising a blower system 400 for supplying pressurised air to an airframe system 450 is shown in FIG. 4. The first example gas turbine engine 10A is generally similar to the gas turbine engine 10 described above with respect to FIGS. 1-3. The blower system 400 is configured to supply pressurised (i.e. compressed) air to the airframe system 450 for an airframe air use (e.g. a particular application or purpose for which the air is supplied to the airframe). The airframe air use may be, for example, aircraft pressurisation (e.g., cabin ventilation), wing anti-icing, fuel tank inerting or cargo bay smoke eradication.

The blower system 400 comprises a compressor 420 configured to receive air from a bypass duct 22 or a core 11 of the gas turbine engine 10A and to discharge compressed air into a delivery line 410 extending from the compressor 420 to an airframe port 452 for supply to the airframe system 450. In the example of FIG. 4, the compressor 420 is configured to receive air from the bypass duct 22 via a supply line 421. However, it will be appreciated that in other examples, the compressor 420 may be configured to receive air from the core 11 via the supply line 421. The blower system 400 (and more particularly the compressor 420) is operable in a blower mode in which the compressor 420 is driven to rotate to draw and compress air from the bypass duct 22 of the gas turbine engine 10A and discharge compressed air into the delivery line 410. The compressor 420 may be any suitable type of compressor. As shown in the examples of FIGS. 4, the compressor 420 may preferably be a centrifugal compressor.

The compressor 420 is mechanically coupled to a drive apparatus configured to drive the compressor 420 to rotate to draw air from the bypass duct 22 and discharge compressed air into the delivery line 410 in the blower mode. The drive apparatus may be provided by an electric drive apparatus such as an electric motor. In the example of FIG. 4, the drive is provided at least in part by a spool 440 of the gas turbine engine 10A such that the compressor 420 is configured to be driven to rotate by the spool 440 in the blower mode. The expression "spool" is used herein to denote a shaft of the engine 10A which interconnects a compressor and a turbine of the engine core, and/or engine components which rotate together with such an engine shaft (e.g., the compressor and turbine interconnected by the shaft, and associated rotating components such as drums and disks). Further, in the example of FIG. 4, the blower system 400 comprises a variable transmission 430 which mechanically couples the compressor 420 to the spool 440.

The variable transmission 430 allows a rotational speed of the compressor 420 to be decoupled from a rotational speed of the spool 440, so that a performance of the blower system 400 is not solely governed by an operating speed of the gas turbine engine (e.g., it can be controlled to operate at a target speed independent of the rotational speed of the spool, and/or at a variable speed ratio relative to the rotational speed of the spool). Inclusion of a variable transmission 430 within the gas turbine engine 10A therefore provides more versatile and adaptable means for supplying pressurised air to the airframe system 450. Various suitable variable transmission types will be apparent to those of ordinary skill in the art. For example, the variable transmission 430 may comprise an electric variator, as described in EP 3517436 B1. In variant examples the compressor may be driven by alternative means other than an engine spool and/or variable transmission as discussed above.

The compressor 420 may also be operable in an engine drive mode in which the compressor 420 is configured to receive air from the delivery line 410 to drive the spool 440 to rotate (thereby acting as a turbine in the engine drive mode). In the engine drive mode the compressor 420 may drive the spool 400 to rotate, for example for starting the gas turbine engine 10A. Additionally or alternatively, the engine drive mode may be used to drive the spool 440 to rotate at a speed below a starting speed of the engine 10A, for example to reduce or prevent the formation of thermal bow of engine components.

The blower system 400 further comprises a heat exchanger 460 configured to transfer heat from the compressed air discharged into the delivery line 410 by the compressor 420 to a coolant. The delivery line 410 comprises a cooling path 412 and a bypass path 414. The cooling path 412 extends through the heat exchanger 460 such that compressed air which flows through the cooling path 412 passes through the heat exchanger 460 for heat exchange with the coolant, while the bypass path 414 bypasses the heat exchanger 460 such that compressed air which flows through the bypass path 414 does not pass through the heat exchanger 460. The cooling path 412 and the bypass path 414 extend between an upstream junction 411 and a downstream junction 413 (the junctions being junctions of the respective paths). The heat exchanger 460 has a compressed air side 462 which forms a portion of the delivery line 410 extending through the heat exchanger 460 (i.e. forms a portion of the cooling path 412). The heat exchanger 460 also has a coolant side 464 configured to receive a coolant for heat exchange with compressed air in the compressed air side 462. A coolant line 480 extends through the coolant side 464 of the heat exchanger 460 such that the heat exchanger 460 is configured to receive coolant via the coolant line 480.

The blower system 400 further comprises a valve arrangement 470 configured to switch the blower system 400 between operation in a baseline mode and a cooling mode, as described in further detail below. In the example of FIG. 4, the valve arrangement 470 comprises a valve configured to control a flow rate of compressed air through the cooling path 412. According to the disclosure, such a valve may be disposed on the cooling path 412 or the bypass path 414 and may be disposed at either, or between, the upstream junction 411 and the downstream junction 413.

In the example of FIG. 4, the valve 474 is disposed on the bypass path 414 such that the valve 474 is configured to selectively restrict flow along the bypass path 414. The valve arrangement 470 is configured to actuate the valve 474 to vary a proportion of the compressed air which flows along the cooling path 412 (and therefore through the compressed air side 462 of the heat exchanger 460) and a corresponding proportion of the compressed air which flows along the bypass path 414. The valve 474 may be operable in at least an open state in which it permits flow along the bypass path 414 and a closed state in which it prevents flow along the bypass path 414. The valve 474 may be operable between a plurality of open states at which flow along the bypass path 414 is restricted to a varying degree.

In the specific example of FIG. 4, the valve 474 is a first valve 474 of the valve arrangement, and the valve arrangement further comprises a second valve 472 disposed on the cooling path 412 such that the second valve 472 is configured to selectively restrict flow along the cooling path 412. In this specific example, the valve arrangement 470 is configured to actuate both the first valve 474 and the second valve 472 to vary a proportion of the compressed air discharged into the delivery line 410 by the compressor 420 which flows along the cooling path 412 and a proportion of the compressed air discharged into the delivery line 410 by the compressor 420 which flows along the bypass path 414. The second valve 472 is operable in at least an open state in which it permits flow along the cooling path 412 and a closed state in which it prevents flow along the cooling path 412. The valve 472 may be operable between a plurality of open states at which flow along the cooling path 414 is restricted to a varying degree. However, it will be appreciated that in variant examples, the valve arrangement 470 may not comprise the second valve 472. In particular, it may be that with any respective valve in a fully open state (or absent any such valve), a flow coefficient of the bypass path is greater than a flow coefficient of the cooling path, such that in use flow preferentially flows down the bypass path. Consequently, adequate control to divert flow between the bypass and cooling paths may be provided solely by a valve provided on the bypass path.

In the specific example of FIG. 4, the valve arrangement 470 comprises a coolant valve 476 disposed on the coolant line 480 and configured to control a flow rate of coolant through the coolant side 464 of the heat exchanger 460 by selectively restricting flow of coolant to the heat exchanger 460 via the coolant line 480. It will be understood that the coolant valve 476 may be disposed on either side of (i.e. upstream of or downstream of) the coolant side 464 of the heat exchanger. The coolant valve 476 is operable in at least an open state in which it permits flow to the coolant side 464 of the heat exchanger 460, and a closed state in which it prevents coolant flow to the coolant side 464 of the heat exchanger 460.

Generally, a coolant side of a heat exchange as envisaged in the present disclosure may be configured to receive coolant comprising, for example, air, combustible fuel, oil, lubricant fluid, water, glycol, hydraulic fluid and/or refrigerant fluid. The coolant side 464 of the heat exchanger 460 in the example of FIG. 4 is configured to receive coolant from the bypass duct 22 of the gas turbine engine 10A via the coolant line 480, such that air received from the bypass duct constitutes the coolant. As shown in the example of FIG. 4, the heat exchanger 460 is be configured to discharge coolant to an external environment 4. In examples in which air received from the bypass duct 22 constitutes the coolant, the heat exchanger 460 may be configured to discharge coolant to the external environment 4 via the bypass duct 22 at a bypass duct outlet, the bypass duct outlet being located downstream of the bypass duct inlet within the bypass duct 22. In other examples in which air received from the bypass duct 22 constitutes the coolant, the heat exchanger 460 may be configured to discharge coolant to the external environment 4 elsewhere, for example at a core terminus outlet, the core terminus outlet being located at or in proximity to a core nozzle 20 of the gas turbine engine.

The gas turbine engine 10A further comprises a controller 490 configured to control the valve arrangement 470 to switch between operation of the blower system 400 in the baseline mode and the cooling mode as will be described in further detail below. The controller may be a FADEC or any other suitable controller, as will be understood. In the example of FIG. 4, the gas turbine engine 10A comprises a temperature sensor 492 configured to monitor a temperature of compressed air at a monitoring location on the delivery line 410 between the compressor 420 and the airframe port 452, which in this specific example is upstream of the heat exchanger 460 but in other examples may be located elsewhere.

Figure 5:
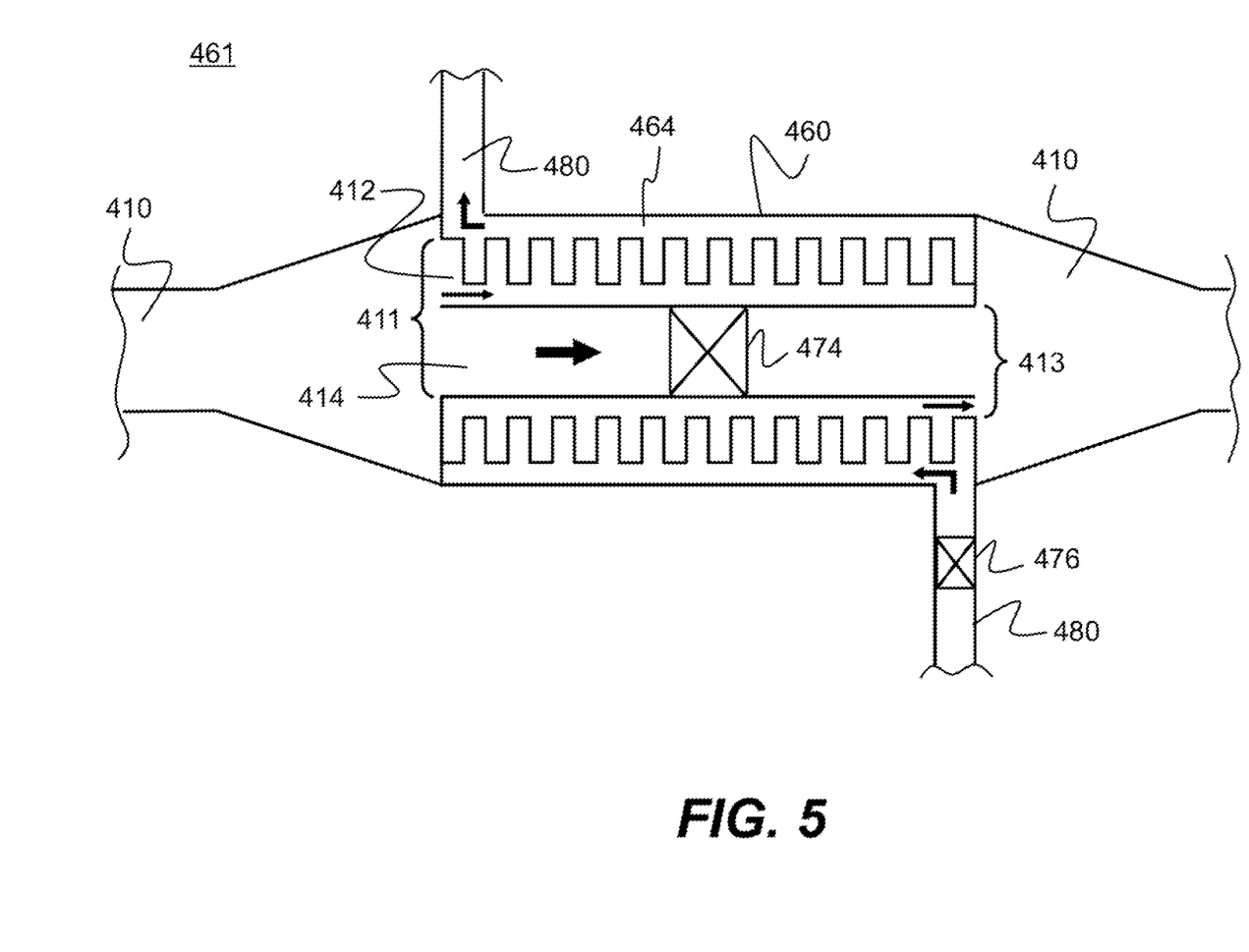
FIG. 5 shows an example of a selective heat exchange module.

FIG. 5 schematically shows an example of a selective heat exchange module 461 to form a portion of a delivery line as envisaged in the disclosure, such as the delivery line 410 of FIG. 4. The selective heat exchange module 461 integrates a heat exchanger 460 as described above with respect to FIG. 4, a valve arrangement 470 as described above with respect to FIG. 4 (although in this example not comprising a second valve configured to restrict flow along the cooling path 412), and a bypass path 414 as described above with respect to FIG. 4.

The selective heat exchange module 461 has a nested arrangement in which the bypass path 414 extends through the cooling path 412. However, it will be appreciated that in other examples, the selective heat exchange module 461 may have a nested arrangement in which the cooling path 412 extends through the bypass path 414.

The valve 474 is disposed along the bypass path 414 within the selective heat exchange module 461 and is configured to selectively restrict flow along the bypass path 414 and thereby vary a proportion of the compressed air discharged into the delivery line 410 by the compressor which flows along the cooling path 412, as described above.

The valve arrangement 470 further comprise a coolant valve 476 disposed along the coolant line 480 extending to a coolant side 464 of the heat exchanger 460, as described above with respect to FIG. 4. In other examples, the coolant valve 476 may be omitted or located elsewhere, such as within the heat exchanger 460 (e.g. within the coolant side 464 of the heat exchanger) or between the heat exchanger 460 and the external environment 4. Although the valve arrangement for the example selective heat exchange module of FIG. 5 does not comprise a valve configured to selectively restrict flow through the cooling path 412, it will be appreciated that in other examples such a valve and respective control functionality may be provided.

The inclusion of the selective heat exchange module 461 within a blower system may enable a more compact blower system 400. In particular, the nested arrangement of the bypass path 414 and the cooling path 412 may enable the selective heat exchange module 461 to have a smaller installation size and may allow the selective heat exchange module 461 to be more easily installed within an installation space of a gas turbine engine.

In the specific example of FIG. 5, the cooling path 412 through the compressed air side 462 of the heat exchanger 460 has a tortuous geometry which is configured to provide a large interfacial area between the compressed air in the compressed air side 462 of the heat exchanger 460 and the coolant in the coolant side 464 of the heat exchanger 460, for efficient heat transfer between the compressed air and the coolant within the heat exchanger 460. The tortuous geometry (e.g. tortuous cooling path 412) may enable a dimension (e.g. a length) of the heat exchanger to be relatively low, therefore permitting a relatively small installation size of the heat exchanger 460. However, the arrangement of the cooling path 412 may present a relatively large restriction to flow of the compressed air therethrough as a result of the tortuosity of the flow passage through the coolant side 462 of the heat exchanger 460. In such examples, the cooling path 412 may be referred to as a restrictive cooling path.

In other examples, the cooling path 412 through the compressed air side 462 of the heat exchanger 460 may extend through (or around) a plurality of cooling tubes (e.g. in a shell and tube heat exchanger), such that an interior (or an exterior) of each cooling tube forms the coolant side 464 of the heat exchanger 460 to provide a large interfacial area between the compressed air in the compressed air side 462 of the heat exchanger 460 and the coolant in the coolant side 464 of the heat exchanger 460. Similarly, other known heat exchanger arrangements, such as a fin and plate arrangement, may be used. Such arrangements may provide a similarly restrictive cooling path by virtue of the relatively narrow and/or tortuous channels and flow passages between and around the respective tubes and fins and may provide good heat transfer efficiency and permit a relatively small installation size of the heat exchanger 460.

In further examples, heat exchanger 460 may be constructed using an additive layer manufacturing (ALM) technique. In such examples, the cooling path 412 through the compressed air side 462 may extend through (or around) an internal topology of the heat exchanger 460 which has been formed using an ALM technique. Such an internal topology may provide a similarly restrictive cooling path to the examples described above and may also provide good heat transfer efficiency and therefore permit a relatively small installation size of the heat exchanger 460.

The total pressure drop between the compressor 420 and the airframe port 452 is a result of resistance to flow provided by various parts of the delivery line. As discussed above, it may be that the cooling path 412 presents a relatively large restriction to flow of compressed air therethrough. Accordingly, the cooling path 412 may present a relatively greater restriction to flow of the compressed air therethrough than flow through the bypass path (at least in a fully open state of the valve 474). The bypass path 414 may therefore have a relatively higher flow coefficient than the cooling path 412, as described elsewhere herein.

The following description of operation of the blower system 400 is given with respect to example of the gas turbine engine of FIG. 4 incorporating the heat exchange module 461 of FIG. 5. When the blower system 400 is in the cooling mode, the controller 490 controls the valve 474 to be in the closed state such that compressed air discharged into the delivery line 410 by the compressor 420 flows through the delivery line 410 to the airframe port 452 via the cooling path 412. While flowing through the cooling path 412, compressed air discharged by the compressor 420 passes through the compressed air side 462 of the heat exchanger 460 to reject heat to coolant passing through the coolant side 464 of the heat exchanger 460. Consequently, the temperature of the compressed air in the delivery line 410 is lower at the airframe port 452 than between the compressor 420 and the heat exchanger 460. Where present, the second valve 472 may be controlled by the controller 490 to adopt the open state in the cooling mode.

When the blower system 400 is in the baseline mode, the controller 490 controls the valve 474 to be in the open state such that compressed air discharged into the delivery line 410 by the compressor 420 flows to the airframe port 452 via the bypass line 414. Where present, the second valve 472 may be controlled by the controller 490 to adopt the closed state in the baseline mode, to prevent flow along the cooling path 412. In examples in which the valve arrangement 470 does not comprise the second valve 472, it may be that a portion of the compressed air discharged into the delivery line 410 flows to the airframe port 452 via the cooling path 412. Because compressed air is permitted to flow through the bypass line 414 the total resistance to flow (i.e. the total pressure drop) provided by the delivery line 410 between the compressor 420 and the airframe port 452 may be reduced (and correspondingly the flow coefficient increased). Therefore, a power demand of the compressor 420 when operated in the blower mode may be reduced when the blower system 400 is operated in the baseline mode. In examples in which it is present, the second valve 472 may be controlled to adopt the closed state in the baseline mode so as to prevent unnecessary heating of the coolant within the heat exchanger 460.

Optionally, in examples in which the valve arrangement 470 comprises the coolant valve 476, the coolant valve 476 may be controlled by the controller 490 to adopt the open state in the cooling mode and to adopt the closed state in the baseline mode, to prevent unnecessary heating of the coolant within the heat exchanger 460. It may be that the coolant line 480 forms part of a coolant system configured to provide cooling to other components of the gas turbine engine, such that preventing coolant flow to the heat exchanger 460 reduces a power demand of the coolant system. Otherwise, it may be that the coolant side 464 of the heat exchanger 460 is configured to receive coolant from the bypass duct 22 of the gas turbine engine 10A via the coolant line 480, such that air received from the bypass duct constitutes the coolant. It may be that, when the coolant valve 476 is controlled to adopt the closed state, an operating efficiency or thrust associated with the propulsive fan of the gas turbine engine may be improved, as no coolant flow is provided from the bypass duct. Therefore, operating the coolant valve 476 in the closed state in the baseline mode may reduce an overall power and/or fuel consumption of the gas turbine engine.

The controller 490 may be configured to receive a cooling signal relating to a temperature of compressed air provided by the delivery line 410 and to control the valve arrangement 470 to switch between the baseline mode and the cooling mode based on the cooling signal. The cooling signal generally corresponds to a demand to cool the compressed air discharged by the compressor 420 into the delivery line 410. Switching between the cooling mode and the baseline mode based on the cooling signal therefore enables the blower system 400 to be operated in the cooling mode only when there is a demand to cool the compressed air provided by the delivery line 410. Otherwise, the controller 490 may be configured to operate the blower system 400 in the baseline mode.

The cooling signal may be received from, for example, an external controller (such as an external controller associated with the airframe system 450). The external controller may be configured to monitor a temperature of air received by the airframe system 450 from the delivery line 410 using temperature monitoring apparatus. The cooling signal may be a signal provided by the external controller to the controller 490 which is indicative of a demand to cool the air provided by the delivery line 410 to the airframe system 450 as a result of the temperature of the compressed air provided by the delivery line 410.

Otherwise, the cooling signal may be provided by the temperature sensor 492 described above, such that the cooling signal directly corresponds to the temperature of the compressed air at the monitoring location. Accordingly, the controller 490 may be configured to control the valve arrangement 470 to switch between operation of the blower system 400 in the baseline mode and the cooling mode based on the temperature monitored by the temperature sensor 492 at the monitoring location.

For example, the controller 490 may be configured to control the valve arrangement 470 so as to cause the blower system 400 to operate in the cooling mode in response to a determination that the temperature of the compressed air at the monitoring location is equal to or greater than a temperature threshold, and to cause the blower system 400 to operate in the baseline mode in response to a determination that the temperature of the compressed air at the monitoring location is less than the temperature threshold.

In variants of the example discussed above, the cooling signal may indirectly correspond to the temperature of compressed air provided by the delivery line 410. In such examples, the cooling signal may correspond to an operating parameter of the gas turbine engine, such as an altitude of the gas turbine engine and/or an operating speed of the compressor 420, for example. The operating parameter of the gas turbine engine may be used by the controller 490 to calculate the temperature of the compressed air provided by the delivery line 410 by referencing a mathematical model of the gas turbine engine. The controller 490 may control the valve arrangement 470 to switch between operation of the blower system 400 in the baseline mode and in the cooling mode based on the calculated temperature of the compressed air provided by the delivery line 410.

For instance, the controller 490 may be configured to control the valve arrangement 470 so as to cause the blower system 400 to operate in the cooling mode in response to a determination that the calculated temperature of the compressed air provided by the delivery line 410 is equal to or greater than the temperature threshold, and to cause the blower system 400 to operate in the baseline mode in response to a determination that the calculated temperature of the compressed air provided by the delivery line 410 is less than the temperature threshold.

Otherwise, it may be that the valve arrangement 470 is thermally activated. For example, it may be that the valve 474 is thermally-actuated and is configured to switch into the closed state when the temperature of compressed air provided by the delivery line 410 is equal to or greater than the temperature threshold and to switch into the open state when the temperature of compressed air provided by the delivery line 410 is less than the temperature threshold.

In general, the temperature threshold may be dependent on a temperature limitation of the airframe system 450 or a temperature limitation of any intervening systems or networks between the airframe port 452 and the airframe system 450. The temperature threshold may be, for example, between 200° C. and 280° C. In particular, when the gas turbine engine is incorporated into an aircraft, the airframe port 452 may be in fluid communication with a wing ducting network which is configured to convey compressed air supplied to the airframe port 452 to the airframe system 450. It may be that the wing ducting network is unable to tolerate a transient temperature of compressed air conveyed therethrough in excess of approximately 260° C. Further, it may be that the wing ducting network is unable to tolerate a steady state temperature of compressed air conveyed therethrough in excess of approximately 240° C. Accordingly, the air temperature threshold may preferably be between 220° C. and 260° C. More preferably, the compressed air temperature threshold may be approximately equal to 240° C.

The valve arrangement 470 may be controlled so that the or each valves adopt states corresponding to either of the baseline mode and the cooling mode, irrespective of whether the compressor 420 is operating in the blower mode or the engine drive mode. Nevertheless, it may be that a demand to cool the compressed air discharged by the compressor 420 into the delivery line 410 corresponds to the blower mode, such that in the controller 490 is configured to control the valve arrangement 470 to operate the blower system in the cooling mode only when the compressor 420 is operated in the blower mode. The controller 490 may be configured to control the valve arrangement 470 to switch between the baseline mode and the cooling mode when the compressor 420 is operated in the blower mode.

In other examples, it may be that a valve arrangement for a blower system as envisaged in the present disclosure is not configured to selectively divert compressed air within a delivery line to a heat exchanger for operation in a cooling mode. Instead, it may be that a valve arrangement is provided to selectively provide coolant to the heat exchanger for operation in the cooling mode, as will be described in further detail below with reference to FIGS. 6 and 7.

Figure 6:
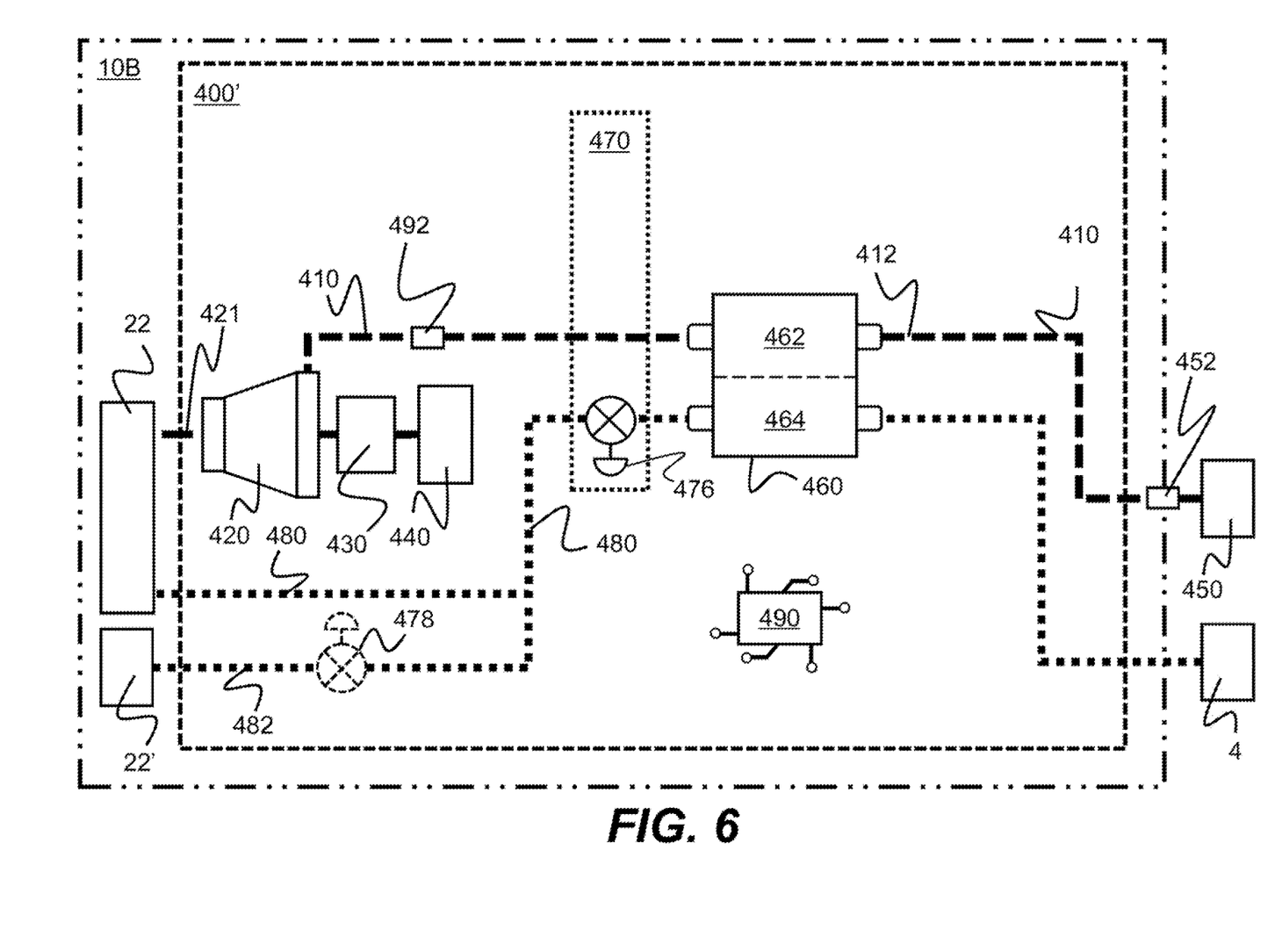
FIG. 6 shows a schematic diagram of a second example gas turbine engine comprising a blower system for supplying pressurised air to an airframe system.

A schematic diagram of a second example gas turbine engine 10B comprising a blower system 400' for supplying pressurised air to an airframe system 450 is shown schematically in FIG. 6. The second example gas turbine engine 10B is generally similar to the first example gas turbine engine 10A described above with reference to FIG. 4, with like reference numerals indicating common or similar features, but differing in features relating to the heat exchanger.

In contrast to the first example gas turbine engine 10A, the valve arrangement 470 is not configured to selectively divert compressed air within the delivery line to the heat exchanger for operation in the cooling mode, and there is no separate bypass and cooling lines.

Instead, as shown in FIG. 6, the delivery line extends through a compressed air side 462 of the heat exchanger (without any bifurcation to a bypass line).

Like the blower system 400 of FIGS. 4 and 5, the blower system 400' of FIG. 6 is configured to operate in a baseline mode and a cooling mode. The valve arrangement 470 comprises a coolant valve 476 as described above with reference to FIG. 4, configured to selectively provide the coolant to the heat exchanger 460 for operation in the cooling mode by actuating the coolant valve 476, and to selectively prevent coolant flowing to the heat exchanger 460 for operation in the baseline mode.

In the example of FIG. 6, air discharged into the delivery line 410 by the compressor 420 flows through the compressed air side 462 of the heat exchanger 460 to the airframe port 452 in both the cooling mode and the baseline mode of the blower system 400.

A pressure drop of compressed air through the compressed air side 462 of the heat exchanger 460 may be dependent on, among other things, a minimum cross-sectional area of the delivery line 410 through the compressed air side 462 of the heat exchanger 460. To ensure that the pressure drop of compressed air in the heat exchanger 460 is relatively low, the minimum cross-sectional area of the delivery line 410 through the compressed air side 462 may be equal to or greater than 100 cm$^2$. Preferably, the minimum cross-sectional area of the delivery line 410 through the compressed air side 462 may be equal to or greater than 150 cm². More preferably, the minimum cross-sectional area of the delivery line 410 through the compressed air side 462 may be equal to or greater than 175 cm². By configuring the delivery line 410 so that the pressure drop in the heat exchanger is relatively low, the inventors have found that compressed air can be delivered for the airframe purpose without causing a significant power demand of the compressor 420.

Figure 7:
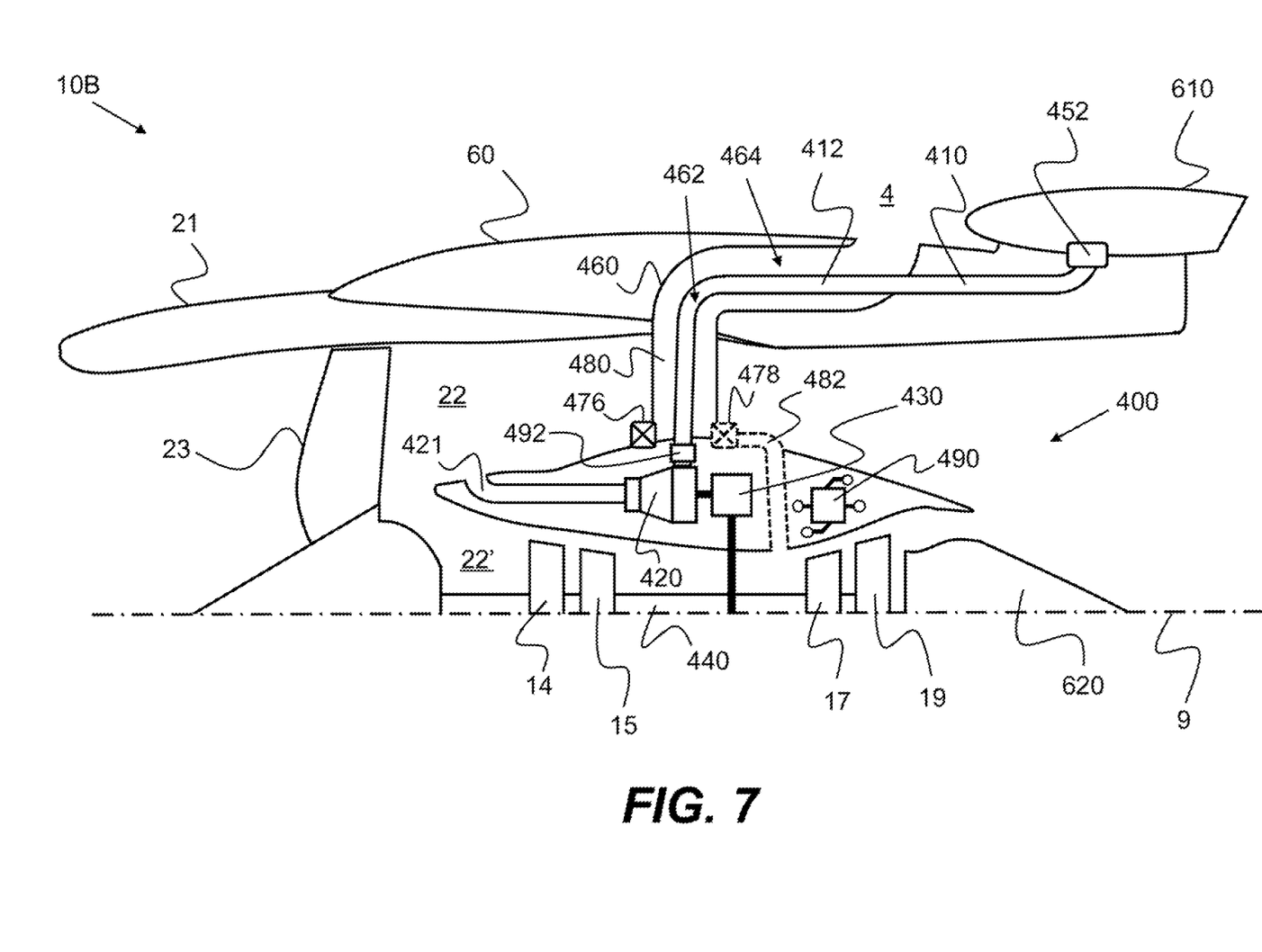
FIG. 7 shows a schematic diagram showing an installation location of parts of the blower system of FIG. 6.

In the example of FIGS. 6 and 7, the coolant side 464 of the heat exchanger 460 is configured to receive coolant from the bypass duct 22 of the gas turbine engine 10B via the coolant line 480, such that air received from the bypass duct 22 constitutes the coolant. Flow of air through the bypass duct 22 (i.e. a bypass airflow) is driven by a propulsive fan of the gas turbine engine, and so flow of coolant through the coolant line 480 is also driven by the propulsive fan. When the coolant valve 476 is in the open state, a portion of the bypass airflow is diverted into the coolant line 480 so that the blower system 400 may be operated in the cooling mode. However, the diversion of a portion of the bypass airflow into the coolant line 480 may reduce a propulsive thrust developed by the gas turbine engine 10B in use, and so it may be advantageous to ensure that the portion of the bypass airflow is directed into the coolant line 480 only when there is a demand to cool the compressed air provided by the delivery line 410. As in the example of FIG. 4, the controller 490 is configured to selectively close the coolant valve 476 for operation in the baseline mode and to selectively open the coolant valve 476 for operation in the cooling mode.

As described above, the coolant side 464 of the heat exchanger 460 is configured to receive coolant in a coolant mode of the gas turbine engine 10B. In this example, the coolant side 464 of the heat exchanger 460 is further configured to receive an exhaust flow of air from a core annulus 22' of the gas turbine engine 10B in a core exhaust mode of the gas turbine engine 10B. A core exhaust line 482 extends from the core annulus 22' of the gas turbine engine 10B to the coolant line 480 such that the heat exchanger 460 is configured to receive the exhaust flow of air from the core annulus 22' via the coolant line 480. The gas turbine engine 10B may further comprise a core exhaust valve 478 configured to move between open and closed states to switch the gas turbine engine 10B between the core exhaust mode and the coolant mode by controlling a flow rate of the exhaust flow of air through the coolant line 480. In FIG. 6, the core exhaust valve 478 is shown along a portion of the line within the blower system 400', although it will be appreciated that this may be provided remote from the blower system 400' proximal to a location where the core exhaust line extends from the core annulus. The controller 490 may be configured to receive a signal relating to an operational state of the gas turbine engine and to control the core exhaust valve 478 to cause the core exhaust valve 478 to switch the gas turbine engine 10B between the coolant mode and the core exhaust mode based on the operational state of the gas turbine engine 10B. In other examples, the gas turbine engine 10B may not be configured to receive an exhaust flow of air from the core annulus 22' of the gas turbine engine 10B.

A schematic diagram showing a possible installation location of parts of the blower system 400' of FIG. 6 is shown schematically in FIG. 7. FIG. 7 shows various turbomachinery components of the gas turbine engine 10B, including a propulsive fan 23, a low pressure compressor 14, a high-pressure compressor 15, a high-pressure turbine 17, a low pressure turbine 19. Also shown is an exhaust cone 620 and a nacelle 21 which forms a housing for gas turbine engine 10B and defines the bypass duct 22. The gas turbine engine 10B has a principal rotational axis 9 about which the spool 440 rotates.

As shown in FIG. 7, the heat exchanger 460 has a tube-in-tube arrangement of the coolant side 464 and the compressed air side 462. In this example, the compressed air side 462 forms a jacket around the coolant side 464 of the heat exchanger 460.

The heat exchanger 460 partially extends through a pylon 60 of the gas turbine engine 10B. The pylon 60 is configured to attach the gas turbine engine to an aircraft, such as to a wing structure 610 of an aircraft as shown for illustrative purposes in FIG. 7. The pylon 60 provides a relatively large installation space for a duct. By selecting the pylon as an installation space for a tube-in-tube heat exchanger, the inventors have found that the heat exchanger 460 can be provided with a relatively longer path length and thereby a relatively large interfacial area between the compressed air in the compressed air side 462 of the heat exchanger 460 and the coolant in the coolant side 464 of the heat exchanger 460, without necessitating an arrangement of the cooling path 412 through the compressed air side 462 of the heat exchanger 460 which presents a relatively large restriction to flow of compressed air therethrough (as is adopted in the heat exchanger of the first example of FIGS. 4 and 5). It is thought that the relatively large interfacial over the relatively long path length of the heat exchanger 460 (including through the pylon) may enable a cross-sectional dimension (e.g. an area or hydraulic radius) of the compressed air side to be relatively large. For example, a relatively large cross-sectional dimension of the compressed air side 462 may correspond to a relatively low heat transfer coefficient per unit path length of the heat exchanger, and this may be offset by a relatively larger path length of the heat exchanger. Providing the heat exchanger 460 in this location may therefore permit adequate heat exchange while maintaining a relatively low resistance to flow (as may be characterised by a flow coefficient or pressure drop along the compressed air side 462), and the contribution of the cooling path 412 to the total pressure drop between the compressor 420 and the airframe port 452 may be reduced.

When the blower system 400 is in the cooling mode, the controller 490 controls the coolant valve 476 to adopt the open state such that air received from the bypass duct 22 flows along the coolant line 480 and through the coolant side 464 of the heat exchanger 460 as driven by the propulsive fan 23. Simultaneously, compressed air discharged into the delivery line 410 by the compressor 420 flows through the delivery line 410 to the airframe port 452 via the cooling path 412. While flowing through the cooling path 412, the compressed air discharged by the compressor 420 passes through the compressed air side 462 of the heat exchanger 460 in which heat of the compressed air is transferred into coolant passing through the coolant side 464 of the heat exchanger 460 such that the compressed air is cooled within the heat exchanger 460. Consequently, the temperature of the compressed air in the delivery line 410 is lower at the airframe port 452 than between the compressor 420 and the heat exchanger 460.

When the blower system 400 is in the baseline mode, the controller 490 controls the coolant valve 476 to adopt the closed state such that air received from the bypass duct 22 does not flow along the coolant line 480 and through the coolant side 464 of the heat exchanger 460. The propulsive fan 23 therefore does not drive coolant flow through the coolant line 480 in the baseline mode, and so the propulsive thrust of the gas turbine engine is not reduced in the baseline mode. Therefore, a fuel efficiency of the gas turbine engine may be greater in the baseline mode than in the cooling mode.

During operation of the gas turbine engine 10B, turbomachinery components of the gas turbine engine are heated as a result of compression of air and combustion of fuel with air in the core annulus 22'. When the gas turbine engine 10B stops operating during an engine shutdown process, the turbomachinery components begin to cool. It may be that air is not able to freely move through the core annulus 22' to provide natural convective cooling to the turbomachinery components. As a result, cooling of the turbomachinery components may be relatively slow and/or uneven. Allowing the exhaust flow of air to be received by the heat exchanger 460 for discharge to the external environment 4 in the core exhaust mode permits relatively hot air be exhausted from the core annulus 22' via the core exhaust line 482 and for relatively cool air to be drawn into the core annulus 22' (e.g. by a natural convective loop). In particular, as shown in the example of FIG. 7, it may be that the heat exchanger 460 is configured to receive the exhaust flow of air from an upper region of the core annulus 22' to promote a buoyancy driven flow to and through the core exhaust line.

Consequently, the turbomachinery components of the core annulus 22' of the gas turbine engine 10B may be more rapidly and consistently cooled following an engine shutdown process of the gas turbine engine 10B. In turn, this may improve a service life of the components of the core annulus 22' and/or may enable an engine start process to be more quickly and easily performed following the engine shutdown process.

Figure 8:
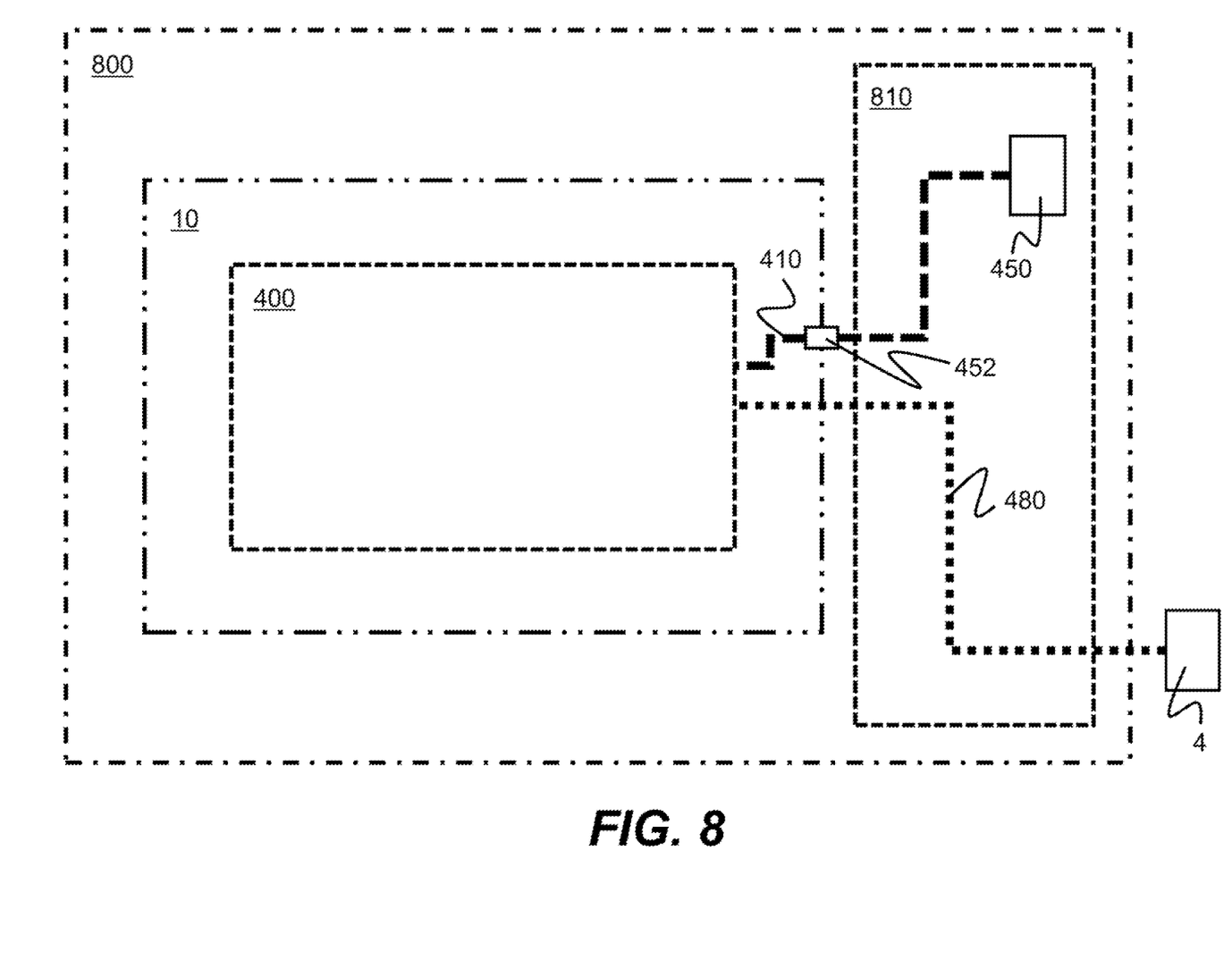
FIG. 8 shows highly schematic diagram of an aircraft including an airframe and a gas turbine engine comprising a blower system for supplying pressurised air to an airframe system.

FIG. 8 shows a highly schematic view of an aircraft 800 which includes an airframe 810 and a gas turbine engine 10 comprising a blower system 400. The gas turbine engine 10 may correspond to any of the example gas turbine engines described above with respect to FIGS. 4-7, with like reference numerals indicating common or similar features. The gas turbine engine 10 may have any suitable combination of the features described above with respect to each example gas turbine engine 10A, 10B and respective blower system 400, 400'. The airframe 810 provides the airframe system 450 to which the airframe port 452 is configured to supply compressed (i.e. pressurised) air.

It will be understood that the invention is not limited to the embodiments above-described and various modifications and improvements can be made without departing from the concepts described herein. In particular, while the present disclosure primarily concerns a gas turbine engine comprising a blower system for providing pressurised air to an airframe system, the disclosed gas turbine engines may also be used for providing air to other structures. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. A gas turbine engine comprising a blower system for supplying pressurised air to an airframe via an airframe port, the blower system comprising:
a compressor configured to receive air from a bypass duct or a core of the gas turbine engine and discharge compressed air into a delivery line extending from the compressor to the airframe port;
a heat exchanger configured to transfer heat from the compressed air to a coolant;
a valve arrangement configured to switch between operation of the blower system in a baseline mode and a cooling mode, the valve arrangement being configured to selectively divert the compressed air within the delivery line to the heat exchanger for operation in the cooling mode.

2. A gas turbine engine according to claim 1, wherein the delivery line comprises a cooling path extending through the heat exchanger and a bypass path bypassing the heat exchanger; and wherein the valve arrangement is configured to selectively divert compressed air within the delivery line to the heat exchanger for operation in the cooling mode by actuating a first valve to control a flow rate of compressed air through the cooling path.

3. A gas turbine engine according to claim 2, wherein the cooling path and the bypass path meet at a downstream junction that is upstream of the airframe port.

4. A gas turbine engine according to claim 2, wherein
the first valve is configured to selectively restrict flow along the bypass path; and
the valve arrangement is configured to actuate the first valve to vary a proportion of the compressed air which flows along the cooling path and a proportion of the compressed air which flows along the bypass path.

5. A gas turbine engine according to claim 2, wherein the delivery line comprises a selective heat exchange module integrating the heat exchanger, the valve arrangement for selectively diverting compressed air to the heat exchanger in the cooling mode, and the bypass path.

6. A gas turbine engine according to claim 5, wherein the selective heat exchange module has a nested arrangement in which one of the cooling path and the bypass path extends through the other of the cooling path and the bypass path.

7. A gas turbine engine according to claim 1, wherein the valve arrangement is configured selectively provide the coolant to the heat exchanger for operation in the cooling mode; and the heat exchanger has a coolant side and a compressed air side forming a portion of the delivery line.

8. A gas turbine engine according to claim 1, wherein the valve arrangement is configured to selectively provide the coolant to the heat exchanger for operation in the cooling mode by actuating a coolant valve to control a flow rate of coolant through the heat exchanger.

9. A gas turbine engine according to claim 1, wherein the heat exchanger is configured to receive the coolant from the bypass duct of the gas turbine engine.

10. A gas turbine engine according to claim 1, comprising a controller configured to receive a cooling signal relating to a temperature of the compressed air provided by the delivery line; wherein the controller is configured to control the valve arrangement to switch between operation of the blower system in the baseline mode and the cooling mode based on the cooling signal.

11. A gas turbine engine according to claim 1, comprising a temperature sensor configured to monitor a temperature of compressed air at a monitoring location on the delivery line between the compressor and the heat exchanger, the gas turbine engine comprising a controller configured to control the valve arrangement to switch between operation of the blower system in the baseline mode and the cooling mode based on the monitored temperature.

12. A gas turbine engine according to claim 11, wherein the controller is configured to control the valve arrangement so as to:
maintain the blower system in the cooling mode in response to a determination that the temperature of the compressed air at the monitoring location is equal to or greater than an air temperature threshold; and maintain the blower system in the baseline mode in response to a determination that the temperature of the compressed air at the monitoring location is less than the air temperature threshold; and wherein the air temperature threshold is between 200° C. and 280° C.

13. An aircraft comprising a gas turbine engine according to claim 1.

14. A gas turbine engine comprising a blower system for supplying pressurised air to an airframe via an airframe port, the blower system comprising:
- a compressor configured to receive air from a bypass duct or a core of the gas turbine engine and discharge compressed air into a delivery line extending from the compressor to the airframe port;
- a heat exchanger configured to transfer heat from the compressed air to a coolant;
- a valve arrangement configured to switch between operation of the blower system in a baseline mode and a cooling mode, the valve arrangement being configured to selectively provide the coolant to the heat exchanger for operation in the cooling mode.

15. A gas turbine engine according to claim 14, wherein the heat exchanger has a coolant side and a compressed air side forming a portion of the delivery line.

16. A gas turbine engine according to claim 15, wherein a minimum cross-sectional area of the delivery line through the compressed air side of the heat exchanger is equal to or greater than 100 cm$^2$.

17. A gas turbine engine according to claim 15, wherein the heat exchanger has a tube-in-tube arrangement of the coolant side and the compressed air side.

18. A gas turbine engine according to claim 15, wherein the heat exchanger at least partially extends through a pylon of the gas turbine engine, which is configured to attach the gas turbine engine to an aircraft.

19. A gas turbine engine according to claim 14, wherein the heat exchanger is configured to receive the coolant from the bypass duct of the gas turbine engine.

20. A gas turbine engine according to any of claim 19, configured so that, in a core exhaust mode, a coolant side of the heat exchanger is configured to receive an exhaust flow of air from a core annulus of the gas turbine for discharge to an external environment.

* * * * *